(12) United States Patent
Patel

(10) Patent No.: US 7,451,228 B2
(45) Date of Patent: *Nov. 11, 2008

(54) SYSTEM AND METHOD OF TRANSMITTING DATA PACKETS

(75) Inventor: Sujal Patel, Seattle, WA (US)

(73) Assignee: Realnetworks, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/108,980

(22) Filed: Apr. 19, 2005

(65) Prior Publication Data

US 2005/0188099 A1    Aug. 25, 2005

Related U.S. Application Data

(63) Continuation of application No. 09/454,870, filed on Dec. 3, 1999, now Pat. No. 6,889,257.

(51) Int. Cl.
*G06F 13/00* (2006.01)
(52) U.S. Cl. .................. 709/232; 709/236; 709/231; 709/235
(58) Field of Classification Search ......... 709/230–233, 709/235, 236, 203; 718/105, 102
See application file for complete search history.

(56) References Cited

U.S. PATENT DOCUMENTS 4,771,391 A    9/1988    Blasbalg
5,197,127 A    3/1993    Waclawsky et al.

(Continued)

FOREIGN PATENT DOCUMENTS

EP        0694830 A1    1/1996

(Continued)

OTHER PUBLICATIONS

Bouras, C., et al., "On-Demand Hypermedia/Multimedia Service Over Broadband Networks", High Performance Distributed Computing 1996, Proceedings of 5th IEEE International Symposium, Aug. 1996, pp. 224-231, XP002180545.

(Continued)

*Primary Examiner*—Kenneth Coulter
(74) *Attorney, Agent, or Firm*—Graybeal Jackson Haley LLP

(57) ABSTRACT

A system and method of transmitting data packets. The system determines one or more system conditions of the server computer and modifies a process of transmitting the data packets from a server computer to a client computer, the modifying based at least in part upon the determined system conditions. The determined system conditions can include: (i) the number of forced processings of network events, (ii) the number of clients computers that are behind their scheduled delivery time, (iii) the number of client computers that have requested streamable data objects, (iv) the total byte count of the streamable data objects that have been requested by the client computers, (v) the number of the streamable data objects that have been requested by the client computers, (vi) the number of streamable data objects that are maintained by the streaming media server, and/or (vii) the actual transmission rate of the streaming media server with respect to the client computers. In one embodiment of the invention, the server computer aggregates data packets prior to transmitting the data packets to a client computer when the load of the server computer becomes high or extremely high.

48 Claims, 4 Drawing Sheets

U.S. PATENT DOCUMENTS

| | | | |
|---|---|---|---|
| 5,572,645 | A | 11/1996 | Dan et al. |
| 5,764,235 | A | 6/1998 | Hunt et al. |
| 5,794,036 | A | 8/1998 | Gomi et al. |
| 5,805,804 | A | 9/1998 | Laursen et al. |
| 5,878,228 | A | 3/1999 | Miller et al. |
| 6,003,089 | A | 12/1999 | Shaffer et al. |
| 6,014,707 | A | 1/2000 | Miller et al. |
| 6,041,354 | A | 3/2000 | Biliris et al. |
| 6,073,180 | A | 6/2000 | Onoda et al. |
| 6,304,914 | B1 | 10/2001 | Deo et al. |
| 6,421,720 | B2 | 7/2002 | Fitzgerald |
| 6,646,987 | B1 | 11/2003 | Qaddoura |
| 6,757,255 | B1 | 6/2004 | Aoki et al. |
| 2001/0029545 | A1* | 10/2001 | Takahashi et al. ........... 709/234 |

FOREIGN PATENT DOCUMENTS

| | | |
|---|---|---|
| EP | 0762275 A2 | 3/1997 |
| WO | WO 94/14256 | 6/1994 |
| WO | WO96/17306 | 6/1996 |

OTHER PUBLICATIONS

J.C. Mogul, S.E. Deering, Path MTU Discovery, Nov. 1, 1990.

J. McCann, S. Deering J. Mogul, Path MTU Discovery for IP version 6, Aug. 1996.

Lee, W., et al., "Adaptive Disk Scheduling Algorithms for Video Servers", Parallel Processing, Sep. 1999, pp. 363-370, XP002180546.

PCT International Search Report dated Nov. 2, 2001.

S. Bradner, Key words for use in RFCs to Indicate Requirement Levels, Mar. 1997.

West, R., et al., "Scalable Scheduling Support for Loss and Delay Constrained Streams", Real-Time Technology and Applications Symposium, Proceedings from the 5$^{th}$ IEEE, Jun. 1999, XP002180547.

* cited by examiner

SYSTEM AND METHOD OF TRANSMITTING DATA PACKETS

CROSS-REFERENCE TO RELATED APPLICATION

This is a continuation of U.S. patent application Ser. No. 09/454,870, filed on Dec. 3, 1999, now U.S. Pat. No. 6,889,257, which is hereby incorporated by referenced in its entirety.

BACKGROUND OF THE INVENTION

1. Field of the Invention

The field of the invention relates to transmitting data via a network. More particularly the invention relates to altering the transmission characteristics of a streaming media server based upon the occurrence of selected conditions.

2. Description of the Related Art

Streaming media is a method of making audio, video, and other multimedia data available in real-time, over a network. FIG. 1 illustrates a typical streaming media system. If the source of the streaming media is a live performance, the performance is often recorded as a data signal by an input device, such as, for example, a microphone 102 or a camera 104. The input device then sends the data signal to an encoding system 106 which converts the data signal into a digital form and compresses the digital signal into streamable data objects 107. The streamable data objects 107 may be sent to a content creation station 108 for editing or may alternatively be sent directly to a streaming media server 110. The content creation station 108 includes content creation software, such as video editing software, that allows the user to modify the streamable data objects 107. The content creation station 108 can also be used to independently create a streamable data objects 107. After being modified or created by the content creation station 108, the streamable data objects 107 may then be transmitted to the streaming media server 110.

Once the streamable data objects 107 are located on the streaming media server 110, the streamable data objects 107 are made available for further distribution and presentation over a network 116, such as the Internet, to a number of client computers 115. One problem, however, related to transmitting streamable data objects over a network is that when the streamable media server 110 may become "overloaded" number of client computers requesting the streamable data objects 107 becomes too high. In that case, the streamable media server is not able to transmit the data packets of the streamable data objects 107 in a timely manner. During peak hours, thousands of client computers 115 can simultaneously request the transmission of selected ones of the streamable data objects 107. In such cases, numerous of the client computers 115 may have to wait in the middle of the presentation of the respective streamable data objects for the transmission of additional data packets, thereby creating an unpleasant interruption for the user.

Therefore, there is a need for a system and method that improves the presentation of streamable data objects to users. The system should determine the system conditions and modify the process of transmitting the data packets from the streaming media server 110 to the client computers 115, thereby improving the presentation of streamable data objects to users at the client computers 115.

SUMMARY OF THE INVENTION

The system and method of the present invention have several features, no single one of which is solely responsible for its desirable attributes. Without limiting the scope of this invention as expressed by the claims that follow, its more prominent features will now be discussed briefly. After considering this discussion, and particularly after reading the section entitled "Detailed Description of the Invention" one will understand how the features of this invention provide a number of advantages over traditional streaming systems.

One embodiment of the invention comprises a method of transmitting a plurality of data packets from a server computer to at least one client computer, the method comprising determining one or more system conditions of the server computer, and modifying a process of transmitting the data packets from the server computer to the client computer, the modifying based at least in part upon the determined system conditions.

Another embodiment of the invention comprises a server computer for transmitting data packets, the server computer comprising a plurality of data packets, and a server program for determining one or more system conditions and for modifying a process of transmitting the data packets from the server computer to a client computer, the modifying based at least in part upon the determined system conditions.

Yet another embodiment of the invention comprises a system for transmitting data packets from a server computer to at least one client computer, the system comprising means for determining one or more system conditions, and means for modifying a process of transmitting the data packets from the server computer to the client computer, the modifying based at least in part upon the determined system conditions.

Yet another embodiment of the invention comprises a system for aggregating data packets, the system comprising a plurality of data packets that collectively comprise one or more streamable data objects, and a server computer operably connected to a client computer via a network, the server computer transmitting the data objects to the client computer, the server computer periodically determining, based upon the load of the server computer, whether to aggregate one or more of the data packets into an aggregated data packet.

Yet another embodiment of the invention comprises a method of aggregating data packets, the method comprising, determining, based upon the load of a server computer, whether to aggregate one or more of the data packets into an aggregated data packet, and transmitting the aggregated data packet to a client computer.

DETAILED DESCRIPTION OF THE INVENTION

The following detailed description is directed to certain specific embodiments of the invention. However, the invention can be embodied in a multitude of different ways as defined and covered by the claims.

System Overview

Figure 1:
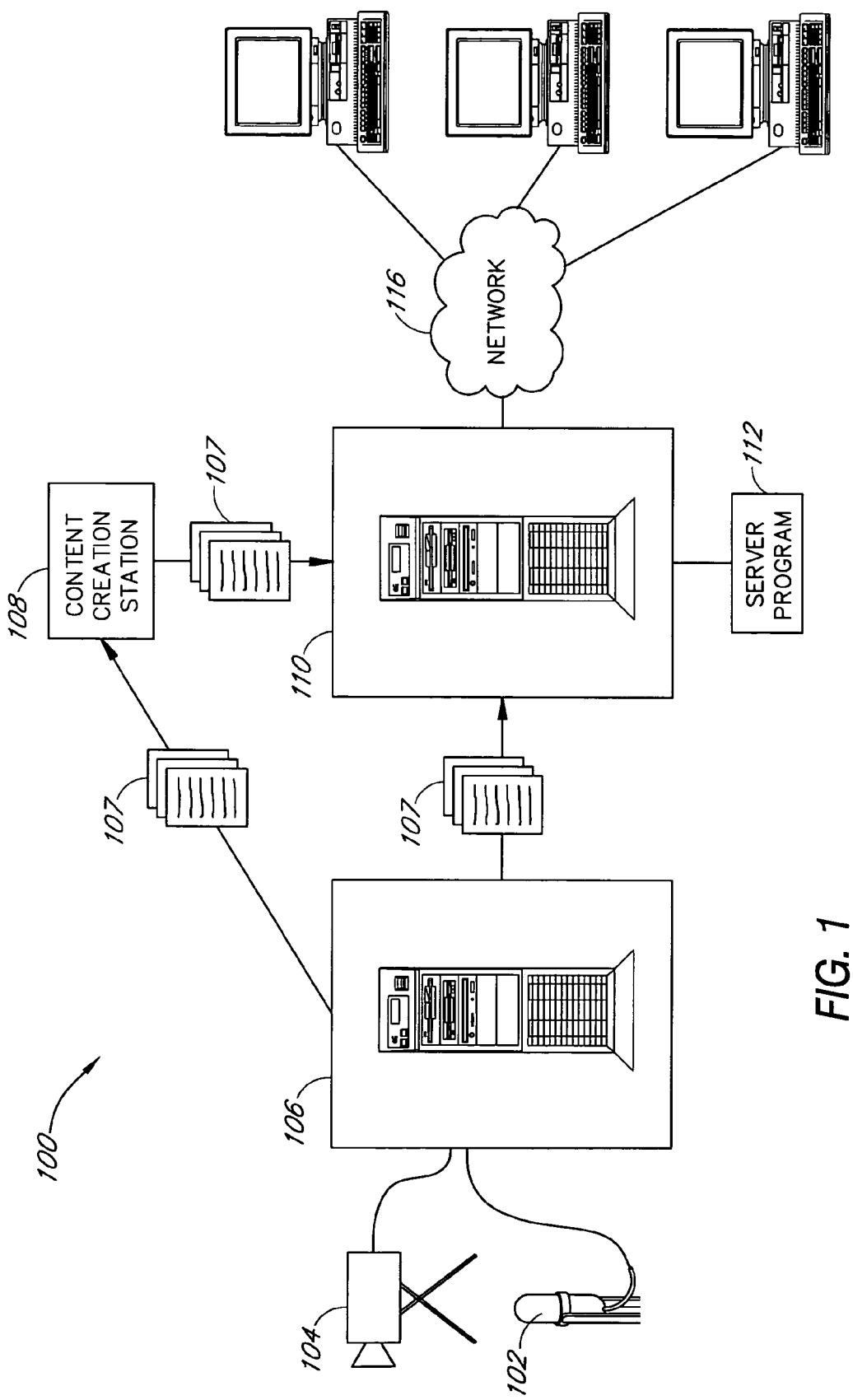
FIG. 1 is a high level block diagram illustrating an exemplary network configuration for streaming data objects from a streaming media server to one or more client computers.

Referring to FIG. 1, an exemplary network configuration 100 will be described. A user communicates with a computing environment which may include multiple streaming media servers (not shown) or a single streaming media server 110 in a client/server relationship on a computer network 116. In a client/server environment, the streaming media server 110 includes a server program 112 which communicates with the client computers 115.

The streaming media server 110, and the client computers 115 may each have one or more conventional general purpose single- or multi-chip microprocessors such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor or a graphics processor. Furthermore, the streaming media server 110 and the client computers 115 may be desktop, server, portable, hand-held, set-top, or any other desired type of configuration. Furthermore, the streaming media server 110 and the client computers 115 each may be used in connection with various operating systems such as: UNIX, LINUX, Disk Operating System (DOS), OS/2, Windows 3.X, Windows 95, Windows 98, and Windows NT.

The streaming media server, 110, and the client computers 115 may each include a network terminal equipped with a video display, keyboard and pointing device. In one embodiment of network configuration 100, one or more of the client computers 115 includes a media player that is used to access the streaming media server 110.

For example, a user of a client computer 115 may utilize the media player to remotely access the server program 112 using a keyboard and/or pointing device and a visual display, such as a monitor. It is noted that although only three client computers 115 are shown in FIG. 1, the network configuration 100 can include hundreds of thousands of client computers and upwards. Furthermore, it is noted that although one streaming media server 110 is shown in FIG. 1, the network configuration 100 can include hundreds of thousands of streaming media servers and upwards.

The network 116 may include any type of electronically connected group of computers including, for instance, the following networks: a virtual private network, a public Internet, a private Internet, a secure Internet, a private network, a public network, a value-added network, an intranet, and the like. In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). The network 116 may connect to the client computer 115, for example, by use of a modem or by use of a network interface card that resides in the client computers 115.

Devices, other than the hardware configurations described above, may be used to communicate with the streaming media server 110. For example, such devices can include: a portable personal computer with a modem or wireless connection interface, a cable interface device connected to a visual display, or a satellite dish connected to a satellite receiver and a television. For convenience of description, each of the above hardware configurations are included within the definition of the client computers 115. Other ways of allowing communication between the user 102 and the streaming media server 110 are envisioned.

Further, it is noted the streaming media server 110 and the client computers 115, may not necessarily be located in the same room, building or complex. In fact, the streaming media server 110 and the client computers 115 could each be located in different states or countries.

The server program 112 comprises various modules, each of the modules comprising various sub-routines, procedures, definitional statements, and macros. Each of the modules are typically separately compiled and linked into a single executable program. Thus, the processes that are undergone by selected ones of the modules may be arbitrarily redistributed to one of the other modules, combined together in a single module, or made available in a shareable dynamic link library.

The server program 112 transmits selected streamable data objects 107 to selected client computers 115. The streamable data objects 107 can be formatted according to any streaming data format and can include all or part of any type of media content such as: a movie, a picture, a slide show, music, a broadcasting program, headline information, or stock quotes. Upon a request from a selected one of the client computers 115, the server program 112 transmits one or more data packets that collectively define the streamable data objects to the selected client computer so that the media player for the selected client computer can render the streamable data object to a user at the client computer. The server program 112 can transmit the data packets using one of several network protocols including: UDP, IP, TCP, ATM, or frame relay.

The server program 112 may be written in any programming language such as C, C++, BASIC, Pascal, Java, and FORTRAN and ran under any of a wide variety of operating systems. C, C++, BASIC, Pascal, Java, and FORTRAN are industry standard programming languages for which many commercial compilers can be used to create executable code.

Method of Operation

Figure 2:
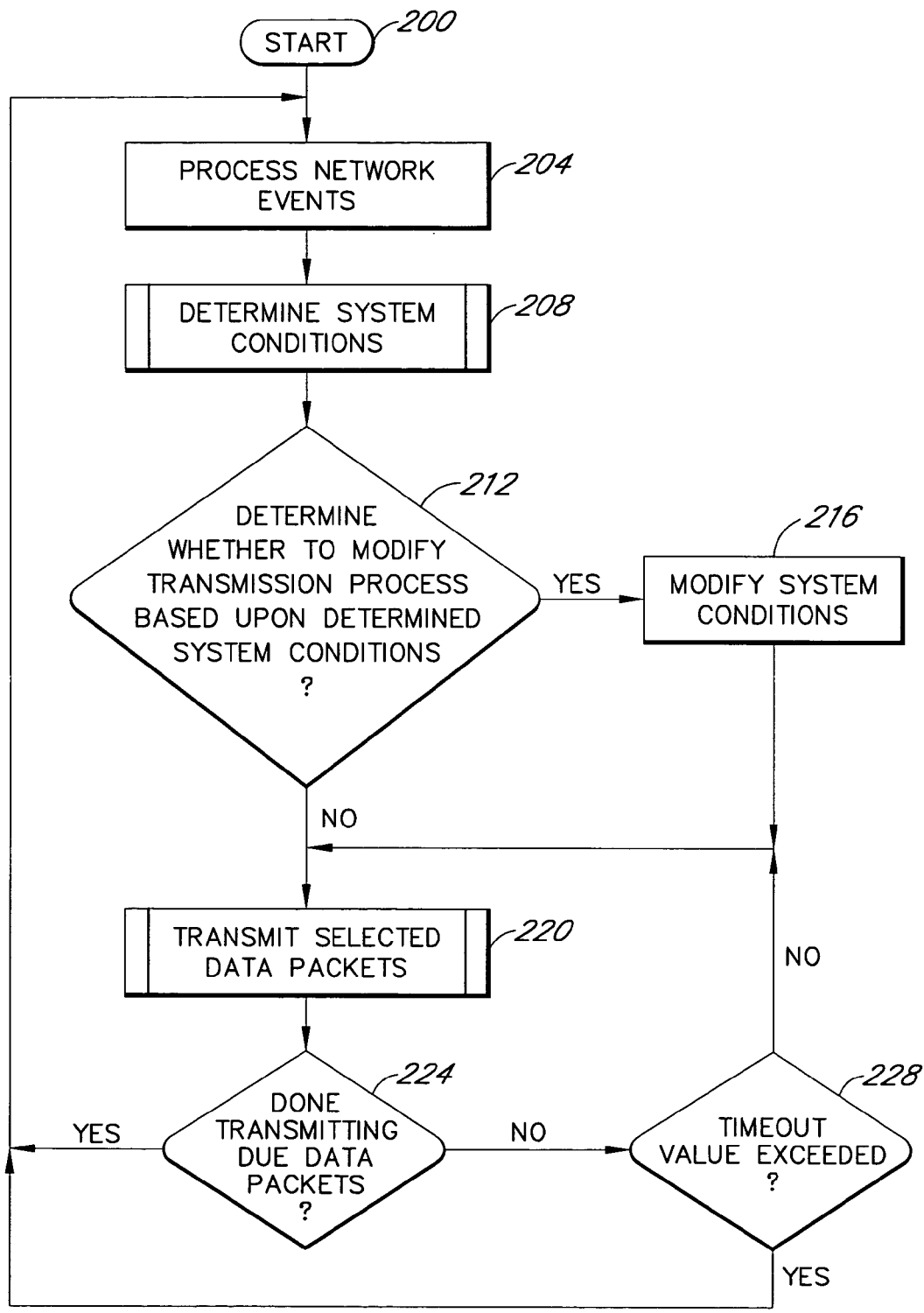
FIG. 2 is a flowchart illustrating a process of modifying a transmission process based upon one or more determined system conditions.

FIG. 2 is a high level flowchart illustrating a process for modifying a streaming media process based upon selected system conditions. Before starting the step 200, the streaming media server 110 has received one or more streamable media objects 107. Furthermore, selected ones of the client computers 115 have requested the streaming media server 110 to transmit or "stream" one or more of the streamable data objects 107 to the client computers 115. It is noted that depending on the embodiment, selected steps can be omitted from FIG. 2 and others can be added.

After starting at a step 200, the streaming media server 110 (FIG. 1) proceeds to a step 204. At the step 204, the streaming media server 110 processes one or more network events. In one embodiment of the invention, the network events can include receiving a command to perform one of the following actions: play one of the streamable media objects 107, pause a presentation one of the streamable media objects 107, seek to a selected location in one of the streamable media objects 107, or re-send a selected data packet. Furthermore, the network events can include receiving a "ping" message from one of the client computers 115. It is noted that a ping message may be used by the client computers 115 to indicate to the streaming media server 110 that the client computers 115 are still operational.

Next, at a step 208, the streaming media server 110 determines one or more system conditions of the streaming media server 110. In one embodiment of the invention, the occurrence of selected system conditions identifies for the streaming media server 110 a need to adjust the process of transmitting the streamable media data objects 107 to the client computers 115. For example, the determined system conditions can include: (i) the number of forced processings of network events (described in further detail below with respect to decision step 228), (ii) the number of client computers 115 that are behind their scheduled delivery time, (iii) the number of client computers 115 that have requested streamable data objects 107, (iv) the total byte count of the streamable data objects 107 that have been requested by the client computers 115, (v) the number of the streamable data objects 107 that have been requested by the client computers 115, (vi) the number of streamable data objects 107 that are maintained by the streaming media server 110, and/or (vii) the actual transmission rate of the streaming media server 110 with respect to the client computers 115.

If the streaming media server 110 (FIG. 1) determines to modify the transmission process of the streamable data objects 107, the streaming media server 110 proceeds to a step 216. At the step 216, the streaming media server 110 modifies one or more of the transmission characteristics of the streaming media server 110. Examples of adjustable transmission characteristics can include: the aggregation or non-aggregation of one or more smaller sized data packets into a larger sized data packet; increasing or decreasing the frequency of transmission of the data packets; increasing or decreasing the size of the data packets when the data packets are initially prepared; changing the network operating system call that is used to transmit and/or receive the data packets, for example, from asynchronous to synchronous or vice-versa; increasing or decreasing the number of channels in the streaming media server 110; and/or changing the types of channels in the streaming media server 110. In one embodiment of the invention, a channel is a network socket. Different types of channels can include various sockets under TCP, IP, or UDP.

Referring again to the decision step 212, if the streaming media server 110 determines not to modify the transmission process based upon the determined system conditions, or, alternatively, after completion of step 216, the streaming media server 110 proceeds to a step 220 wherein the streaming media server 110 transmits selected data packets to the client computers 115. In one embodiment of the invention, the streaming media server 110 transmits selected packets according to a priority scheme. In this embodiment, each of the data packets has an associated transmission deadline time. The transmission deadline time that is associated with the data packet indicates a point in time whereby the streaming media server 110 should have transmitted the data packet to a respective one of the client computers 115. In one embodiment, the streaming media server 110 transmits each of the data packets having the highest priority according to the transmission deadline times that are respectively associated with the data packets.

Next, the streaming media server 10 proceeds to a decision step 224. At the decision step 224, the streaming media server 110 determines whether it has transmitted each of the data packets that are due according to the transmission deadline times that are respectively associated with each of the data packets. If the streaming media server 110 determines that it has processed all of the data packets that are due, the streaming media server 110 returns to the step 204 to process any new network events that have occurred.

Referring again to the decision step 224, if the streaming media server 110 determines that all of the data packets that are due have not been processed, the streaming media server 10 proceeds to a decision step 228.

At the decision step 228, the streaming media server 110 determines whether a time out threshold has been exceeded. It is noted that in periods of high load for the streaming media server 110, the streaming media server 110 will not be able to transmit all of the streamable data objects 107 to the client computers 115 in a timely manner. To prevent the streaming media server 110 from occupying all of its time transmitting data, the streaming media server 110 employs a watch dog timer that informs the streaming media server 110 when the streaming media server 110 has been processing and transmitting outgoing data packets for a selected time interval. In one embodiment of the invention, the selected time interval is about ⅓ of a second. In another embodiment of the invention, the selected time interval is between about ¼ of a second and about ¾ of a second. In yet another embodiment of the invention, the selected time interval is between about ⅕ of a second and about ⅞ of a second.

Still referring to the decision step 228, if the streaming media server 110 determines that the time out threshold has not been exceeded, the streaming media server 110 returns to the step 220 to process additional data packets. However, if the streaming media server 110 determines that the time out value threshold has been exceeded, the streaming media server 110 interrupts the transmission of the data packets that are due and returns to the step 204. It is noted that an interruption of the transmission of the data packets to process the network events is herein referred to as a "forced processing of a network event."

Figure 3:
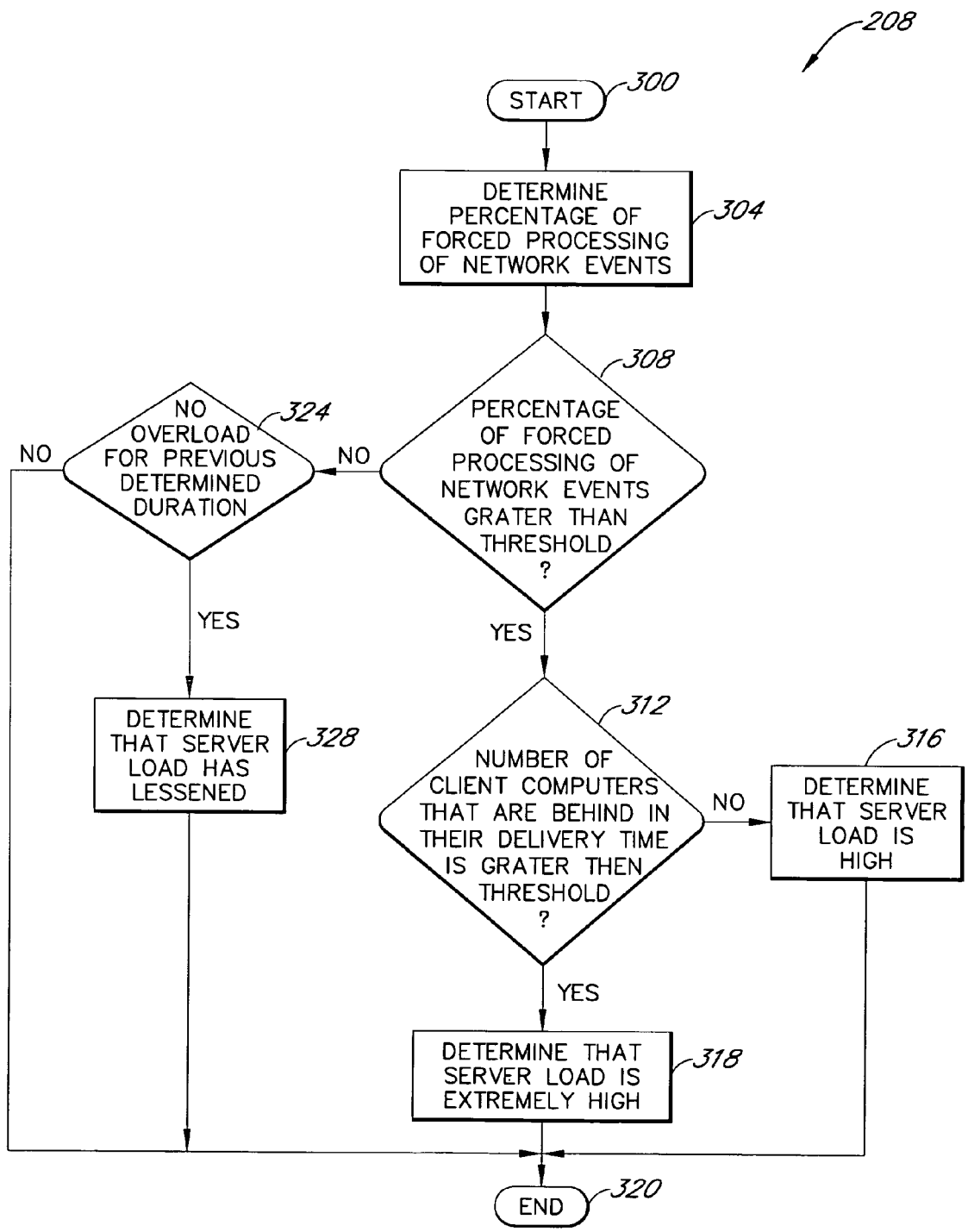
FIG. 3 is a flowchart illustrating a process of aggregating data packets in the streaming media server shown in FIG. 1.

FIG. 3 is a flowchart illustrating one embodiment of a process of determining the server load. FIG. 3 illustrates in further detail the steps that occur in step 208 of FIG. 2 for one embodiment of the invention. In this embodiment, the streaming media server 110 maintains a state machine to describe the current system load. The state machine comprises three states to describe the system load, namely, NORMAL, HIGH, and EXTREMELY HIGH. It is to be appreciated that fewer or more states may be used. Furthermore, it is to be appreciated that other descriptions for the states may be used, e.g., LOW, VERY LOW, ABOVE NORMAL, DANGEROUS. It is noted that depending on the embodiment, selected steps can be omitted from FIG. 3 and others can be added.

After starting at a step 300, the streaming media server 110 proceeds to a step 304 wherein the streaming media server 110 determines the processing percentage of the forced processings of network events that occur within the streaming media server 110. The processing percentage is defined as the number of the forced processings of network events that occur within the streaming media server 110 divided by the total number of network events. It is noted that as the percentage of forced processings gets higher, this indicates that the streaming media server 110 is spending more of its time in transmitting data packets as opposed to other activities, such as processing network events. Accordingly, if the percentage of forced processings exceeds a processing threshold, the streaming media server 110 assumes that the server load is HIGH.

Moving to a step 308, the streaming media server 110 determines whether the percentage of forced processings of network events exceeds the processing threshold. It is noted that, in one embodiment of the invention, the processing threshold is about 70%. In another embodiment of the invention, the processing threshold is between about 65% and about 75%. In yet another embodiment of the invention, the processing threshold is between about 55% and about 95%.

If the streaming media server 110 determines that the percentage of forced processings of network events exceeds the processing threshold, the streaming media server 110 determines that the load of the server is either HIGH or EXTREMELY HIGH. In this event, the streaming media server 110 then proceeds to a decision step 312 to more particularly determine the server load. It is noted that in one embodiment, the state of the load of the streaming media server 110 is initially set to NORMAL.

At the decision step 312, the streaming media server 110 determines whether the percentage of client computers 115 that are behind in their scheduled delivery time is greater than a scheduling threshold. The scheduling threshold is defined as the number of client computers 115 that are behind in their scheduled delivery time divided by the total number of client computers 115 that are being serviced. If the streaming media server 110 determines that the percentage of client computers 115 that are behind in their scheduled delivery time is greater than a scheduling percentage threshold, the streaming media server 110 proceeds to a step 318, and the streaming media server 110 determines that the state of the load of the streaming media server 110 is EXTREMELY HIGH. The streaming media server 110 then moves to an end step 320, and the process flow continues at the decision step 212 of FIG. 2.

Referring again to the decision step 312 of FIG. 3, if the streaming media server 110 determines that the percentage of client computers 115 that are behind in their scheduled delivery time is less than or equal to the scheduling percentage threshold, the streaming media server 110 proceeds to a step 316, and the streaming media server 110 determines that the state of the server load is HIGH. The process flow then continues to the end step 320 (discussed in further detail above).

Referring again to the decision step 308, if the streaming media server 110 (FIG. 1) determines that the percentage of forced processings of network events is less than or equal to the processing threshold, the streaming media server 110 proceeds to a decision step 324. At the decision step 324, the streaming media server 110 determines whether the streaming media server 110 had been in a overload state at any point during a previous predefined duration. In one embodiment of the invention, the predefined duration is about 5 minutes. In another embodiment of the invention, the predefined duration is about between 4 and ½ minutes and about 5 and ½ minutes. In yet another embodiment of the invention, the predefined duration is about between 1 and 8 minutes. Furthermore, in one embodiment of the invention, the streaming media server 110 defines an overload state to include the states HIGH and EXTREMELY HIGH.

In the embodiment shown with respect to step 324, the streaming media server 110 maintains an overload state until the streaming media server 110 has experienced a below-threshold percentage of forced processings for the predefined duration.

If the streaming media server 110 detects an overload state for the previous predefined duration, the streaming media server 110 determines that sufficient time has not yet passed to downgrade the status of the server load, and the server 110 proceeds to the end step 320 (discussed further above). However, if the streaming media server 110 was not in an overload state for the previous predefined duration, the streaming media server 110 proceeds to a step 328. At the step 328, the streaming media server 110 reduces the severity of the state of the server load. For example, if the state of the server load is EXTREMELY HIGH, the streaming media server 110 can reduce the state of the server load to HIGH. Furthermore, for example, if the state of the server load is HIGH, the streaming media server 110 can reduce the load to NORMAL. The streaming media server 110 then proceeds to the end step 320 (discussed in further detail above).

Figure 4:
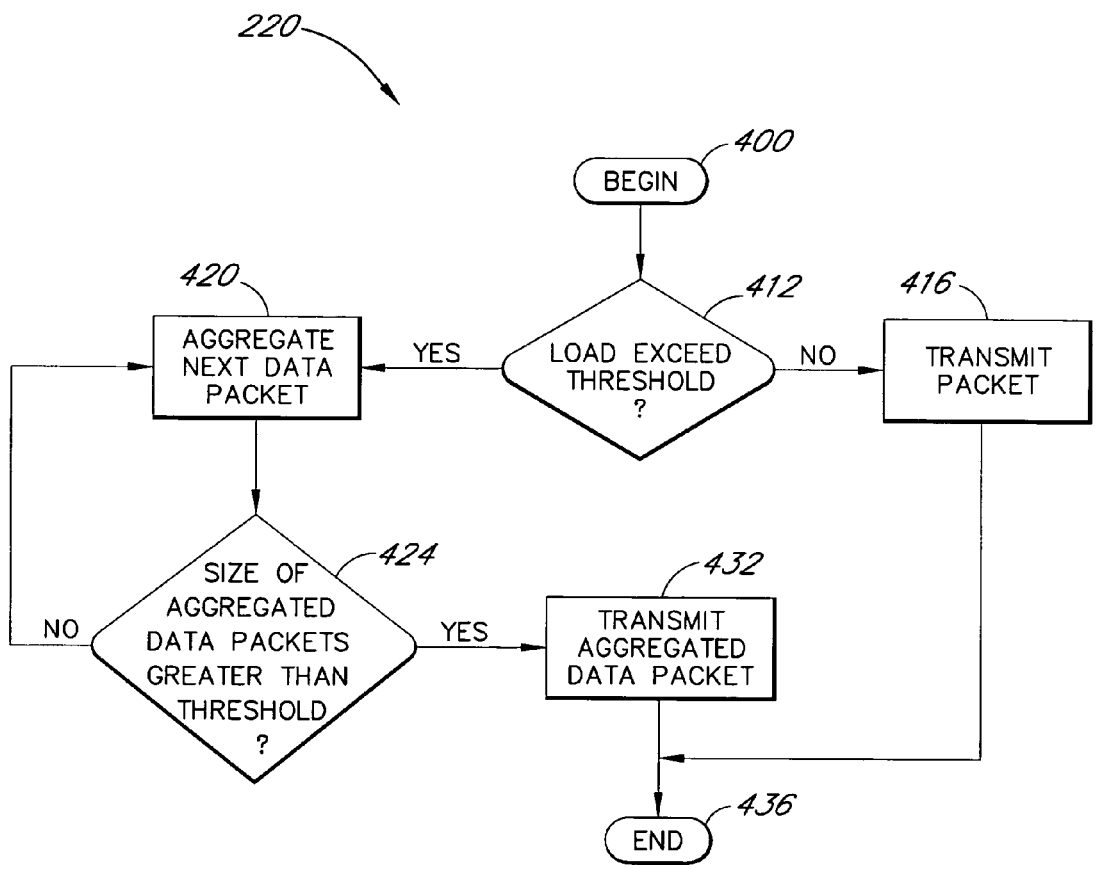
FIG. 4 is a flowchart illustrating a process for determining the load of the server shown in FIG. 1.

FIG. 4 is a flowchart illustrating a process for aggregating packets. By aggregating packets into an aggregated packet, the streaming media server 110 improves the throughput of the data packets to the client computers 115, thereby improving quality of the presentation of the streamable data objects 107 by the client computers 115. Aggregation of data packets ultimately reduces the number of data packets per second, therefore reducing the number of operating system calls and the overall system/CPU load. It is noted that although packet aggregation improves the throughput of data packets to the client computers 115, selected ones of the client computers 115 may encounter a reduction in the quality of the presentation if one or more of the aggregated data packets are "lost" in transmission.

FIG. 4 describes in further detail the steps that occur within step 220 of FIG. 2. It is noted that depending on the embodiment, selected steps can be omitted from FIG. 4 and others can be added. After starting at a step 400, the streaming media server 110 (FIG. 1) proceeds to a step 412, wherein the streaming media server 110 determines whether the system load exceeds a selected threshold. In one embodiment of the invention, if the state of the load is either HIGH or EXTREMELY HIGH, the streaming media server 110 determines that the load is above the selected threshold. Furthermore, if the streaming media server 110 determines that the server load is below the selected threshold.

If the streaming media server 110 (FIG. 1) determines that the load does not exceed the selected threshold, the streaming media server 110 proceeds to a step 416. At the step 416, the streaming media server 110 transmits a packet of the streaming media server 110 to one of the client computers 115. The streaming media server 110 then proceeds to an end step 436, and process flow returns the decision step 224 of FIG. 2.

Referring again to the decision step 412, if the streaming media server 110 determines that the server load exceeds the selected threshold, the streaming media server proceeds to a step 420.

At the step 420, the streaming media server 110 aggregates one or more data packets into an aggregated data packet. In one embodiment of the invention, the streaming media server 110 selects each of the data packets that are due for transmission according to a requested transmission time that is associated with each of the packets.

Proceeding to a decision step 424, the streaming media server 110 determines whether the size of the aggregated data packet is greater than an aggregation threshold. The size of the aggregation threshold can either be predefined or alternatively, dynamically determined. In one embodiment of the invention, the size of the aggregation threshold is based upon the state of the load of the streaming media server 110 as well as the actual delivery rate between the streaming media server 110 and the client computer 115. In one embodiment of the invention, the sizes of the aggregation thresholds are set forth below in Table 1.

TABLE 1

| Conditions | Minimum Threshold | Maximum Threshold |
|---|---|---|
| server load = NORMAL | 200 | 300 |
| server load = HIGH and actual delivery rate < 100,000 | 700 | 1000 |
| (Server load = HIGH and actual deliver rate >= 1000,000) or server load = EXTREMELY HIGH | 1000 | 1350 |

As is shown in Table 1, depending on selected conditions, the streaming media server 110 aggregates data packets until the size of the aggregated data packet exceeds the minimum threshold without exceeding the maximum threshold. It is noted that if the size of the aggregated packet is below the minimum threshold, but another packet cannot be added without exceeding the maximum threshold, the streaming media server 110 will not add the data packet to the aggregated data packet. Furthermore it is noted that the actual delivery rate is defined as the average of the total number of kilobytes per second being delivered by the streaming media server 110 to the client computers 115.

In one embodiment of the invention, the streaming media server 110 does not generate an aggregated data packet whose size is greater than the maximum transmission unit (MTU) for the network configuration 100 (FIG. 1). The MTU is defined as the largest packet is that is transported by intermediary network devices. If a data packet is larger than the MTU, the intermediary network devices partitions the data packet into multiple data packets, each of an acceptable size. However, as can be appreciated by one of ordinary skill in the art, if a partitioned data packet is lost, all of the other partitioned data packets are unusable by the client computer 115, even if received. Accordingly, in this embodiment, the invention advantageously avoids that problem.

Still referring to the decision step 424, if the streaming media server 110 determines that the size of the aggregated data packet exceeds the selected threshold, the streaming media server 110 proceeds to a step 432. At the step 432, the streaming media server 110 transmits the aggregated data packet to respective ones of the client computers 115. The streaming media server 110 then proceeds to the end step 436, and process flow returns to the decision step 224 of FIG. 2.

Referring again to the decision step 424 of FIG. 4, if the streaming media server 110 determines that size of the aggregated packet is less than the threshold, the streaming media server 110 returns to the step 420 to add another data packet to the aggregated data packet.

Advantageously, the present invention allows for the modification of a process of transmitting data packets based upon the system conditions of the streaming media server. For example, during periods of high or extreme load, the streaming media server 110 can aggregate data packets into an aggregated data packets. It is noted that the aggregating data packets into an aggregated data packet may reduce the quality of presentation for selected user, data packet aggregation decreases the overall server load and increases the quality of the presentation of the streaming data objects to a majority of the client computers 115.

What is claimed is:

1. A method implemented in hardware for aggregating a plurality of data packets on a server computer, the method comprising:
    determining a server load of the server computer; and
    in response to determining the server load, accumulating the plurality of data packets into an aggregated data packet until a size of the aggregated data packet exceeds a minimum threshold size, and wherein the minimum threshold size is related to the server load.

2. The method of claim 1, wherein determining the server load comprises comparing a number of data packets that are overdue to a total number of data packets.

3. The method of claim 1, wherein determining the server load comprises comparing a number of network events processed by a server program that is executing on the server computer due to exceeding a time out threshold to a total number of network events that the server program processes.

4. The method of claim 3, wherein the network events are selected from the group comprising: a play command, a pause command, a seek command, a ping command, and a re-send command.

5. The method of claim 1, wherein the server load is based at least in part upon an actual transmission rate between the server computer and a client computer.

6. The method of claim 1, wherein the size of the plurality of data packets are not increased larger than a maximum transmission unit size for any intermediary network device that is in a transmission path between the server computer and a client computer on the network.

7. The method of claim 1, wherein the minimum threshold size is about 200 bytes and wherein the maximum threshold is about 300 bytes.

8. The method of claim 1, wherein the minimum threshold size is about 700 bytes and wherein the maximum threshold is about 1000 bytes.

9. The method of claim 1, wherein the minimum threshold size is about 1000 bytes and wherein the maximum threshold is about 1350 bytes.

10. The method of claim 1, additionally comprising increasing or decreasing the number of channels that are used to transmit a plurality of streamable data objects.

11. The method of claim 1, additionally comprising either increasing or decreasing a frequency of transmission of the plurality of data packets.

12. A server computer for aggregating data packets via a communications network, the server computer comprising:
    a data memory operative to store a plurality of data packets; and
    a server program stored in a program memory for determining a server load and for, in response to determining the server load, repackaging at least two of the plurality of data packets into a single data packet having a size; and for initiating the transmitting of the data packets to the communications network, wherein the single data packet size exceeds a minimum threshold size, and wherein the minimum threshold size is set as a function of the load of the server computer.

13. The server computer of claim 12, wherein the data packets collectively comprise a streamable data object.

14. The server computer of claim 12, wherein determining the server load comprises comparing a number of the data packets that are overdue to a total number of data packets.

15. The server computer of claim 12, wherein determining the server load comprises comparing a number of network events processed by a server program that is executing on the server computer due to exceeding a time out threshold to a total number of network events that the server program processes.

16. The server computer of claim 15, wherein the one or more network events is selected from the group comprising: a play command, a pause command, a seek command, a ping command, and a re-send command.

17. The server computer of claim 12, additionally comprising, in response to determining the system condition, increasing a number of channels that are used to transmit the plurality of data packets.

18. The server computer of claim 12, additionally comprising, in response to determining the system conditions, either increasing or decreasing a frequency of transmission of the plurality of data packets.

19. A system implemented in hardware for aggregating data packets, the system comprising:
    a plurality of data packets that collectively comprise one or more streamable data objects; and
    a server computer operably connected to a client computer via a network, the server computer transmitting the data objects to the client computer, the server computer periodically determining, based upon the load of the server computer, whether to aggregate one or more of the data packets into an aggregated data packet having a size, wherein the size of the aggregated data packet exceeds a minimum threshold size, and wherein the minimum threshold size is dependent on the load of the server computer.

20. The system of claim 19, wherein determining the server load comprises comparing a number of data packets that are overdue to a total number of data packets.

21. The system of claim 19, wherein determining the server load comprises comparing a number of network events processed by a server program that is executing on the server computer due to exceeding a time out threshold to a total number of network events that the server program processes.

22. The system of claim 21, wherein the network events are selected from the group comprising: a play command, a pause command, a seek command, a ping command, and a re-send command.

23. The system of claim 19, wherein the server load is based at least in part upon an actual transmission rate between the server computer and a client computer.

24. The system of claim 19, wherein the data packets are not aggregated larger than the size of a maximum transmission unit for any intermediary network device that is in the transmission path between the server computer and a client computer.

25. The system of claim 19, wherein the size of the minimum threshold relates to a quality of presentation of the plurality of data packets and the maximum threshold relates to a maximum transmission unit.

26. The system of claim 19, wherein the minimum threshold is about 200 bytes and wherein the maximum threshold is about 300 bytes.

27. The system of claim 19, wherein the minimum threshold is about 700 bytes and wherein the maximum threshold is about 1000 bytes.

28. The system of claim 19, wherein the minimum threshold is about 1000 bytes and wherein the maximum threshold is about 1350 bytes.

29. A method implemented in hardware for aggregating data packets, the method comprising:
determining, based upon the load of a server computer, whether to aggregate one more of the data packets into an aggregated data packet with a size, wherein the size of the aggregated data packet exceeds a minimum threshold size and wherein the minimum threshold size is related to the load of the server computer; and
transmitting the aggregated data packet to a client computer.

30. The method of claim 29, wherein the one or more data packets are not aggregated in an aggregated data packet larger than the size of a maximum transmission unit for any intermediary network device that is in the transmission path between the server computer and the client computer.

31. The method of claim 29, wherein determining the server load comprises comparing a number of data packets that are overdue to a total number of data packets.

32. The method of claim 29, wherein determining the server load comprises comparing a number of network events processed by a server program that is executing on the server computer due to exceeding a time out threshold to a total number of network events that the server program processes.

33. The method of claim 32, wherein the network events are selected from the group comprising: a play command, a pause command, a seek command, a ping command, and a re-send command.

34. The method of claim 29, wherein the server load is based at least in part upon an actual transmission rate between the server computer and the client computer.

35. The method of claim 29, wherein the minimum threshold is about 200 bytes.

36. The method of claim 29, wherein the minimum threshold is about 700 bytes.

37. The method of claim 29, wherein the minimum threshold is about 1000 bytes.

38. The method of claim 29, wherein the size of the minimum threshold relates to a quality of presentation of the data packets.

39. A method implemented in hardware for generating data packets, the method comprising:
determining, in a server device, a maximum transmission unit value of an intermediary network device being disposed on the network between a client device and the server device, the maximum transmission unit value identifying a largest packet size that is capable of being transported by the intermediary network device via the network; and
generating a data packet with a size of the data packet being limited to the maximum transmission unit value and exceeding a minimum threshold size, wherein the minimum threshold size is related to the load of the server device.

40. The method of claim 39, wherein the size of the data packets is not larger than the size of a maximum transmission unit for any intermediary network device that is in the transmission path between the server device and the client device.

41. The method of claim 39, additionally comprising transmitting the generated packet from the server device to the client device via the Internet.

42. A method implemented in hardware comprising:
determining a maximum data packet size based on an actual transmission rate between a server computer and a client computer; and
generating a data packet having a size less than the maximum data packet size and more than a minimum threshold size, wherein the minimum threshold size is related to the load of the server computer.

43. The method of claim 42, wherein the actual transmission rate includes a current transmission rate between the server computer and the client computer.

44. The method of claim 42, wherein the data packet contains video information.

45. A computer-readable storage medium storing a program that, when executed by a computer, causes the computer to:
determine a load of the computer; and
in response to the determination, aggregate a plurality of data packets into a aggregate data packet having a size that exceeds a minimum threshold size, wherein the minimum threshold size is related to the computer load.

46. The computer-readable storage medium of claim 45 wherein the program further causes the computer to transmit to a second computer the aggregate data packet.

47. The computer-readable storage medium of claim 45 wherein the program further causes the computer to:
determine a maximum transmission unit value of an intermediary network device in a network that includes the computer and a second computer, the network device being disposed between the computer and the second computer, the maximum transmission unit value identifying the largest packet size that is capable of being transported by the intermediary network device via the network, and
limit the size of the aggregate data packet to less than the largest packet size and more than the minimum threshold size.

48. The computer-readable storage medium of claim 45 wherein the program further causes the computer to:
    determine a maximum data packet size based on an actual transmission rate between the computer and a second computer, and
    limit the size of the aggregate data packet to less than the maximum data packet size and more than the minimum threshold size.

* * * * *